United States Patent
Taniguchi et al.

(10) Patent No.: US 8,578,868 B2
(45) Date of Patent: Nov. 12, 2013

(54) OXYFUEL COMBUSTION BOILER PLANT

(75) Inventors: Masayuki Taniguchi, Hitachinaka (JP); Tsuyoshi Shibata, Hitachiota (JP); Yoshiharu Hayashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 349 days.

(21) Appl. No.: 12/893,733

(22) Filed: Sep. 29, 2010

(65) Prior Publication Data

US 2011/0073020 A1 Mar. 31, 2011

(30) Foreign Application Priority Data

Sep. 30, 2009 (JP) .................................. 2009-225902

(51) Int. Cl.
| F23B 70/00 | (2006.01) |
| F23B 80/02 | (2006.01) |
| F23C 9/00  | (2006.01) |
| F23J 11/00 | (2006.01) |
| F23J 15/00 | (2006.01) |

(52) U.S. Cl.
USPC .......................... 110/205; 110/204; 110/345

(58) Field of Classification Search
USPC ......... 110/205, 347, 204, 265, 368, 232, 234, 110/302, 345, 348, 182.5
See application file for complete search history.

(56) References Cited

U.S. PATENT DOCUMENTS

| 2005/0120927 A1* | 6/2005 | Okazaki et al. ............... 110/261 |
| 2008/0286707 A1* | 11/2008 | Panesar et al. ................. 431/10 |
| 2009/0013871 A1* | 1/2009 | Darde et al. .................... 95/129 |

FOREIGN PATENT DOCUMENTS

| JP | 5-231609 A | 9/1993 |
| JP | 6-94212 A | 4/1994 |
| JP | 6-101809 A | 4/1994 |
| JP | 7-318016 A | 12/1995 |
| JP | 2007-147162 A | 6/2007 |

* cited by examiner

Primary Examiner — Kenneth Rinehart
Assistant Examiner — Tavia Sullens
(74) Attorney, Agent, or Firm — Crowell & Moring LLP

(57) ABSTRACT

An oxyfuel combustion boiler plant comprising: an air separation unit for manufacturing oxygen by separating nitrogen from air, a boiler having a burner for burning the oxygen supplied from the air separation unit and pulverized coal, and a primary system pipe for supplying the pulverized coal to the burner, an exhaust gas recirculation system pipe for supplying combustion exhaust gas discharged from the boiler to the primary system pipe, and a carbon dioxide capture unit for capturing carbon dioxide in the exhaust gas discharged from the boiler, the oxyfuel combustion boiler plant is further comprising: an oxygen supply pipe for supplying the oxygen manufactured by the air separation unit to the primary system pipe in the burner, and a pipe for supplying the combustion exhaust gas discharged from the boiler to the oxygen supply pipe, wherein an injection port of the oxygen supply pipe is disposed on an upstream side of an injection portion of the burner.

5 Claims, 18 Drawing Sheets

OXYFUEL COMBUSTION BOILER PLANT

CLAIM OF PRIORITY

The present application claims priority from Japanese patent application serial No. 2009-225902, filed on Sep. 30, 2009, the content of which is hereby incorporated by reference into this application.

BACKGROUND OF THE INVENTION

1. Field of the Invention

The present invention relates to an oxyfuel combustion boiler plant.

2. Description of Related Art

A boiler for burning pulverized coal can be divided into two kinds of combustion systems depending on the gas to be supplied to a burner. Air-fuel combustion is of a system for burning fuel by supplying air to the burner. Further, oxyfuel combustion is of a system far burning fuel by a mixture of high purity oxygen and combustion exhaust gas instead of air.

In the oxyfuel combustion, the exhaust gas components are mostly carbon dioxide, so that when capturing carbon dioxide from exhaust gas, there is no need to concentrate the carbon dioxide. Therefore, the oxyfuel combustion can pressurize and cool the exhaust gas as it is and liquefy and separate the carbon dioxide, so that it is one of the valid methods of reducing the discharge rate of carbon dioxide.

In the oxyfuel combustion system, as a method for accelerating ignition of pulverized coal flowing in the vicinity of the burner, a method for injecting oxygen toward a mixture flow of pulverized coal and combustion exhaust gas is proposed (Patent Document 1).

DOCUMENT OF PRIOR ART

Patent Document

Patent Document 1: Japanese Patent Laid-open No. Hei 7 (1995)-318016

SUMMARY OF THE INVENTION

However, when injecting oxygen toward the mixture flow of pulverized coal and combustion exhaust gas, there are possibilities that pulverized coal may enter a mass of gas having a high oxygen concentration and abnormal combustion such as a backfire may occur. Particularly, immediately after starting oxygen supply or when changing the operation conditions, abnormal combustion occurs easily.

Therefore, an object of the present invention is to provide an oxyfuel combustion boiler plant for improving the ignition property of the burner and making it difficult for abnormal combustion to occur.

According to the present invention, an oxygen supply pipe for supplying oxygen manufactured by an air separation unit to a primary system pipe in the burner, a system for supplying combustion exhaust gas discharged from the boiler to the oxygen supply pipe, and an injection port of the oxygen supply pipe is disposed on the upstream side of an injection portion of the burner.

According to the present invention, an oxyfuel combustion boiler plant for improving the ignition property of the burner and making it difficult for abnormal combustion to occur can be provided.

DETAILED DESCRIPTION OF THE INVENTION

Hereinafter, the preferred embodiments of the present invention will be explained with reference to the accompanying drawings.

Embodiment 1

Figure 1:
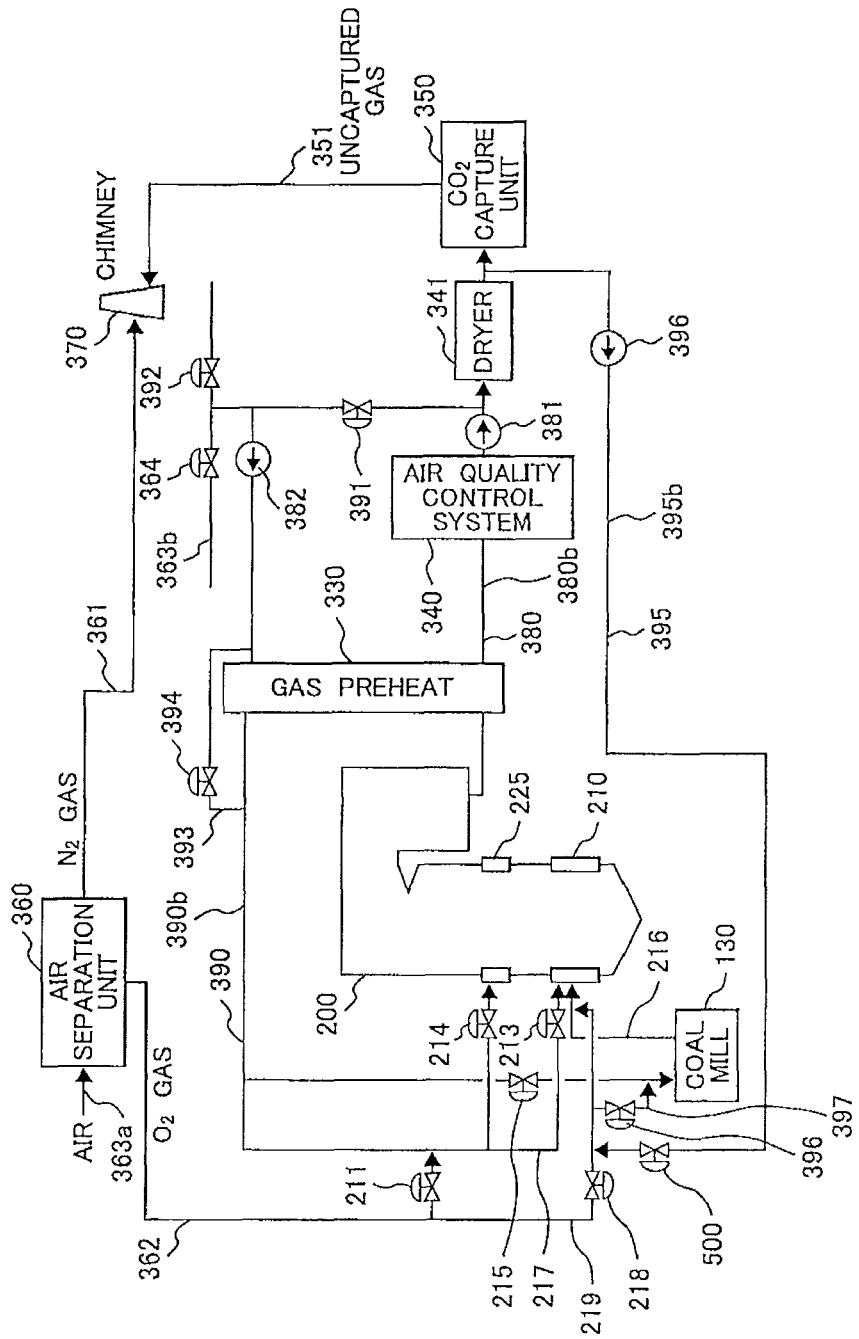
FIG. 1 is a drawing for illustrating an oxyfuel combustion boiler plant of the first embodiment.

FIG. 1 shows the oxyfuel combustion boiler plant using coal as fuel. This embodiment is a thermal power plant for generating steam using a boiler 200.

The boiler 200 includes a burner 210 and a gas port 225. The burner 210 supplies and burns pulverized coal to the furnace in the boiler. The gas port 225 is disposed on the downstream side of the burner 210 and supplies second stage combustion gas to the furnace.

The system through which combustion exhaust gas discharged from the boiler 200 flows will be explained below. A combustion exhaust gas pipe 380b indicates the pipe through which the exhaust gas 380 discharged from the boiler 200 flows. An air quality control unit 340 is an apparatus for purifying exhaust gas 380. A fan 381 is a unit for letting exhaust gas flow. A dryer 341 cools exhaust gas 380 and simultaneously removes hygroscopic moisture. A $CO_2$ capture unit 350 compresses exhaust gas 380 after drying and captures carbon dioxide from the exhaust gas 380. Uncaptured gas 351 indicates gas remaining after carbon dioxide is captured by the $CO_2$ capture unit 350. A circulation exhaust gas pipe 390b indicates a pipe through which a part of the combustion exhaust gas 380 discharged from the boiler is re-circulated to the boiler 200 as circulation exhaust gas 390. A circulation exhaust gas flow rate regulating valve 391 has a function for adjusting the flow rate of circulation exhaust gas 390. A fan 382 is a unit for pressurizing circulation exhaust gas 390 so as to re-circulate it to the boiler 200. A gas preheater 330 permits the combustion exhaust gas 380 and circulation exhaust gas 390 to exchange heat, and thereby heats the circulation exhaust gas 390. Low-temperature circulation exhaust gas 393 is bypassed the gas preheater 330. A bypass flow rate control valve 394 has a function for adjusting the flow rate of the circulation exhaust gas 393. Flow rate regulating valves 213 and 214 have functions for adjusting the flow rates of the circulation exhaust gas 390 at which it is supplied respectively to the burner 210 and air port 225.

And, in this embodiment, to return the circulation exhaust gas 390 discharged from the dryer 341 to a first oxygen supply pipe 219, a pipe 395b through which a small quantity of combustion exhaust gas 395 flows is installed. This pipe 395b includes a pressurizing fan 396 and a flow rate regulating valve 500 for adjusting the flow rate.

Further, an air-fuel combustion air pipe 363b, at the time of air-fuel combustion, supplies external air to the boiler 200. On the air-fuel combustion air pipe 363b, air flow rate regulating valves 364 and 392 are installed.

Next, the oxygen supply system will be explained. An air separation unit 360 is an apparatus for separating nitrogen from air 363a and manufacturing oxygen. Oxygen gas 362 is manufactured by the air separation unit 360. The first oxygen supply pipe 219 is a pipe for letting the oxygen gas 362 pass through. On the first oxygen supply pipe 219, a flow rate regulating valve 218 for adjusting the flow rate of oxygen supplied to a primary system pipe 216. Further, a flow rate regulating valve 211 is a valve for adjusting the flow rate of oxygen supplied to the circulation exhaust gas 390. And, a second oxygen supply pipe 397 is a pipe for supplying oxygen to the circulation exhaust gas 390 on the upstream side of a coal mill 130. Also on the second oxygen supply pipe 397, a flow rate regulating valve 396 is installed.

Further, nitrogen gas 361 is discharged to a chimney 370.

And, the coal mill 130 pulverizes coal and generates pulverized coal. The primary system pipe 216 of the burner 210 supplies the pulverized coal from the coal mill 130 to the burner 210 together with circulation exhaust gas 390. The system for supplying the circulation exhaust gas 390 to the coal mill 130 includes a flow rate regulating valve 215. Further, the pipe for supplying the circulation exhaust gas 390 directly to the burner 210 is assumed as a secondary system pipe 217.

The system pipe of the combustion exhaust gas 380 discharged from the boiler 200 includes the gas preheater 330, the air quality control unit 340 for purifying exhaust gas, the fan 381 for letting gas flow, the carbon dioxide capture unit 350 for cooling, liquefying, and capturing carbon dioxide in the exhaust gas, and the chimney 370 for discharging the uncaptured gas 351 composed of mainly nitrogen and oxygen remaining after the capture of carbon dioxide.

As shown in FIG. 1, the boiler plant of this embodiment includes the air separation unit 360 for separating air to gas mainly composed of nitrogen and gas mainly composed of oxygen and manufacturing high purity oxygen. The air separation unit 360 is a system for separating oxygen and nitrogen using a difference in the boiling point between them and cools the air, thereby manufacturing oxygen. This embodiment does not depend upon the air separation method but may depend on other methods such as a film separation system for separating air using a difference in the size between nitrogen molecules and oxygen molecules.

The air separation unit 360 separates the air 363a to the oxygen gas 362 and nitrogen gas 361 mainly composed of nitrogen. The separated nitrogen gas 361 is discharged into air from the chimney 370.

If fuel is burnt using high purity oxygen instead of air, the flame temperature becomes excessively high, thus there are possibilities that the burner for burning fuel and the wall surface of the boiler may be damaged. Therefore, oxygen gas manufactured by the air separation unit 360 is mixed with the circulation exhaust gas 390 which is a part of exhaust gas 380 discharged from the boiler 200 and is supplied to the burner 210 and second stage combustion gas port 225. The circulation exhaust gas 390 is raised in temperature by the gas preheater 330. A part of the circulation exhaust gas 390 is permitted to bypass without passing through the gas preheater 330 and the low-temperature circulation exhaust gas 393 is mixed with the circulation exhaust gas, thus the temperature is adjusted. The flow rate of the low-temperature circulation exhaust gas 393 is adjusted by the bypass flow rate control valve 394.

The circulation exhaust gas 390 is a part of the gas after being purified by the air quality control unit 340 and is raised in temperature by the gas preheater 330. The flow rate of the circulation exhaust gas 390 can be adjusted by the aperture of the circulation exhaust gas flow rate regulating valve 391.

The oxygen gas 362 supplied to the burner 210 and gas port 225 can be adjusted in the flow rate by adjusting the apertures of the flow rate regulating valves 211, 213, and 214. Further, the flow rate of the circulation exhaust gas 390 can be similarly adjusted by controlling the apertures of the flow rate regulating valves 213 and 214.

Coal which is fuel is pulverized to pulverized coal by the coal mill 130, passes through the primary system pipe 216 together with a part of the circulation exhaust gas 390 passing through the flow rate regulating valve 215, and then is conveyed to the burner 210. The burner 210 mixes and burns secondary system gas having a high oxygen concentration flowing through the secondary system pipe 217 and primary system gas composed of pulverized coal and circulation exhaust gas which flow through the primary system pipe 216, thereby generates high-temperature combustion gas in the furnace of the boiler 200.

Here, the oxygen concentration in the primary system gas is several %, so a problem arises that pulverized coal hardly ignites in the vicinity of the burner. Therefore, if the oxygen gas 362 is supplied to the primary system pipe 216, the oxygen concentration of the primary system gas increases and the ignition property of pulverized coal is improved. However, immediately after oxygen is supplied to the primary system pipe 216, a mass of gas having a high oxygen concentration close to pure oxygen is formed inside the primary system pipe 216. If pulverized coal particles enter the mass of gas, the pulverized coal is oxidized under the condition of an extremely high oxygen concentration and there are possibilities that abnormal combustion such as a backfire may occur. If abnormal combustion occurs, an extremely high-temperature flame is formed and the burner and the pipe connected to the burner may become molten. To prevent abnormal combustion, a small quantity of the combustion exhaust gas 395 is recirculated through the pipe 395b and after the flow rate is adjusted by the small fan 396 and flow rate regulating valve 500, is supplied to the first oxygen supply pipe 219. As mentioned above, the pipe system for supplying combustion exhaust gas 380 discharged from the boiler 200 to the oxygen supply pipe 219 is disposed, thus the burner 210 can be prevented from abnormal combustion.

Furthermore, the second oxygen supply pipe 397 supplies the oxygen gas 362 to the upstream side pipe for supplying circulation exhaust gas 390 to the coal mill 130. The oxygen concentration of circulation exhaust gas 390 flowing into the coal mill 130 is slightly increased beforehand, thus the pulverized coal ignition property in the vicinity of the burner can be improved even more.

Figure 2:
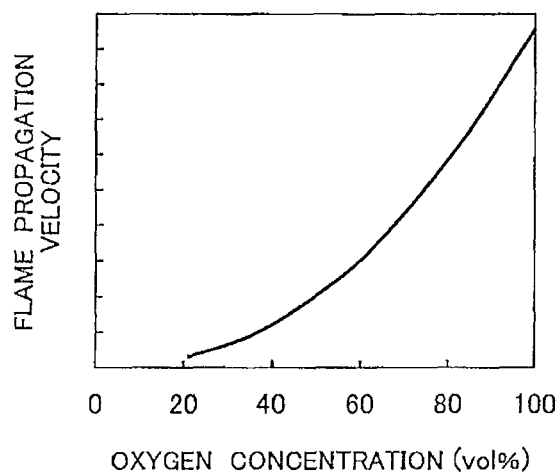
FIG. 2 is a drawing for illustrating the relation between the oxygen concentration in the oxidizing gas and the flame propagation velocity of pulverized coal.

The possibility of abnormal combustion occurring is strongly correlated to the flame propagation velocity. FIG. 2, assuming exhaust gas of the oxyfuel combustion boiler is mixed with oxygen as an oxidizing gas, shows the relation between the oxygen concentration in the oxidizing gas and the flame propagation velocity of pulverized coal. The flame propagation velocity when pulverized coal is mixed in pure oxygen or gas close to pure oxygen is very high. To decrease the flame propagation velocity and prevent abnormal combustion from hardly occurring, it is very valid to decrease the oxygen concentration. For example, if the oxygen concentration is decreased from 100% to 70 to 80%, the flame propagation velocity is decreased by about half, so the occurrence of abnormal combustion can be considerably suppressed. If a small quantity of exhaust gas is mixed in oxygen gas, the effect of decreasing the flame propagation velocity is great.

In FIG. 1, a part of the combustion exhaust gas discharged from the dryer 341 is circulated as a small quantity of the combustion exhaust gas 395 through the pipe 395b. The reason is that the temperature of the combustion exhaust gas becomes lowest. The flame propagation velocity is even influenced by the temperature of the oxidizing gas and as the temperature of the oxidizing gas goes down, the flame propagation velocity is decreased. Therefore, as the temperature of a small quantity of the combustion exhaust gas 395 goes down, the effect of preventing the occurrence of abnormal combustion is heightened. Further, in combustion exhaust gas, water vapor is generally included. If water vapor is condensed into dewdrops in the pipe for combustion exhaust gas, the pipe is easily corroded. As shown in FIG. 1, if exhaust gas after drying is circulated, the pipe is more difficult corrode.

In FIG. 1, when a small quantity of the combustion exhaust gas 395 is not supplied to the first oxygen supply pipe 219, there are possibilities that a mixture of pure oxygen and pulverized coal may be formed in the pipe of the primary system pipe 216. Therefore, in this embodiment, 20% of the oxygen quantity supplied from the first oxygen supply pipe 219 is set as the combustion exhaust gas 395. As mentioned above, if a small quantity of the combustion exhaust gas 395 is supplied to the first oxygen supply pipe 219, only a mixture of oxidizing gas of 80% oxygen and pulverized coal is formed, thus the danger of abnormal combustion occurring can be greatly reduced.

Further, the ignition property of pulverized coal in the vicinity of the burner influences the average oxygen concentration when combustion exhaust gas and oxygen gas which are supplied to the first oxygen supply pipe 219 are mixed sufficiently. Further, if the supply rate of the combustion exhaust gas 395 is low, the influence on the average oxygen concentration after mixing is small.

Even in such a boiler of the oxyfuel combustion system, at the start time, power (electric power) for driving the air separation unit 360 cannot be obtained and the oxygen gas 362 cannot be supplied to the boiler. Further, at the start time of the air separation unit 360, the circulation exhaust gas quantity cannot be stably ensured. Therefore, a method for driving the air separation unit 360 by the air-fuel combustion system is proposed. When operating the air separation unit 360 by the air-fuel combustion system, the circulation exhaust gas flow rate regulating valve 391 is closed, and the air flow rate regulating valves 364 and 392 are opened, thus the air 363b can be supplied instead of exhaust gas. Therefore, the air-fuel combustion can be executed as usual.

Embodiment 2

Figure 3:
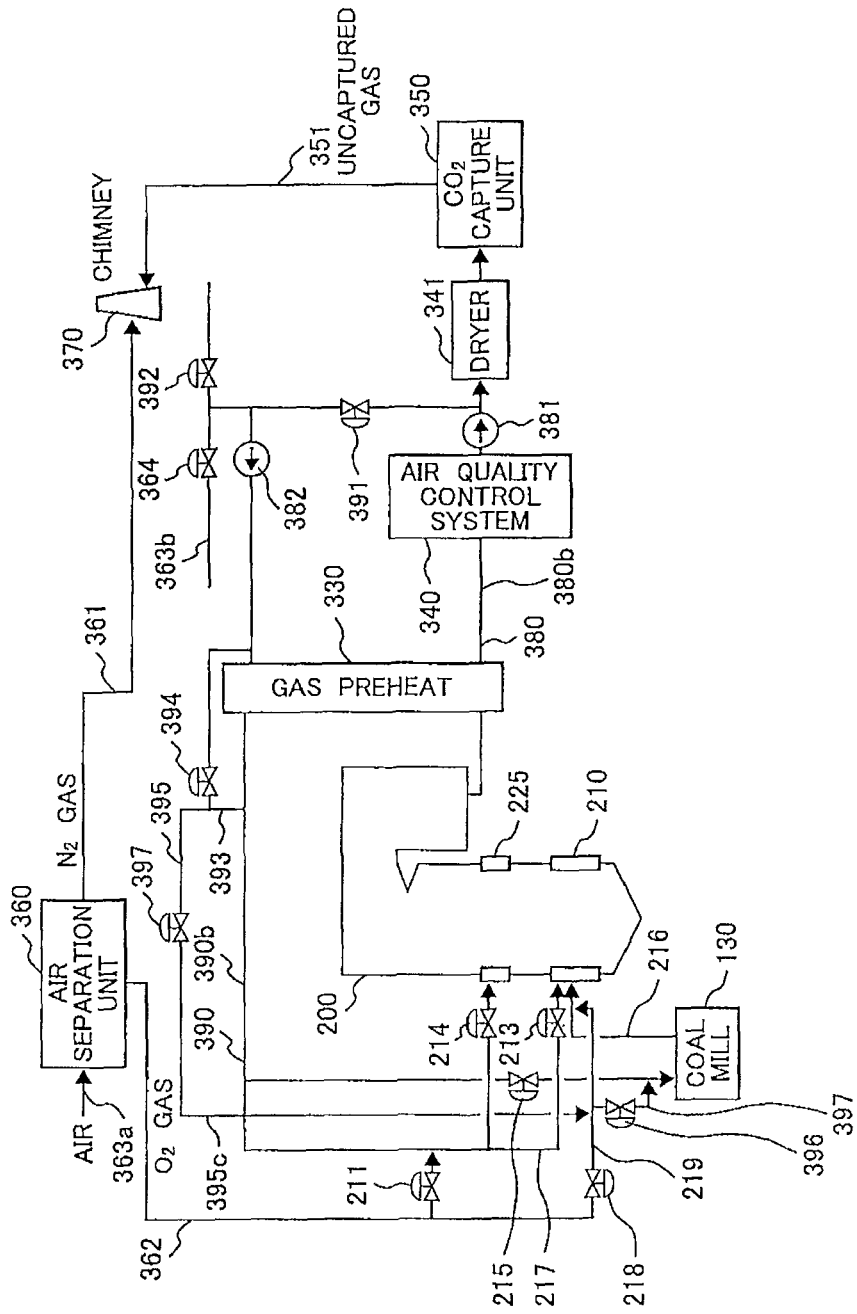
FIG. 3 is a drawing for illustrating a drawing for illustrating an oxyfuel combustion boiler plant of the second embodiment.
Figure 4:
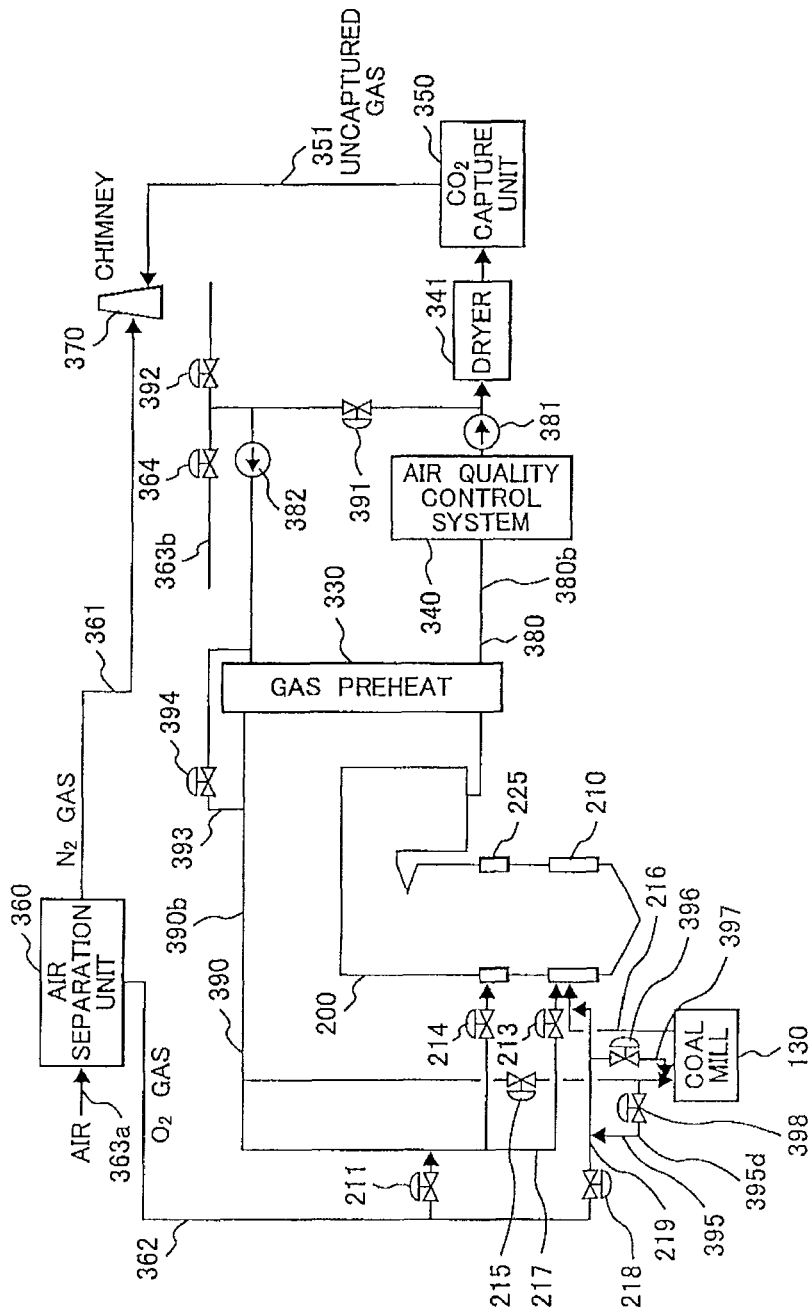
FIG. 4 is a drawing for illustrating a modification of the oxyfuel combustion boiler plant of the second embodiment.

FIGS. 3 and 4 show a modification of the method for supplying a small quantity of the combustion exhaust gas 395. In FIG. 3, among the circulation exhaust gas 390, a part of the low-temperature circulation exhaust gas 393 not passing through the gas preheater 330 is branched and is supplied to the first oxygen supply pipe 219 through the pipe 395c. By use of the low-temperature exhaust gas, the effect of decreasing the flame propagation velocity is increased.

FIG. 4 shows a method for branching a part of the circulation exhaust gas 390 supplied to the first oxygen supply pipe 219 through the pipe 395d which is branched from the pipe 390b which supplies the circulation exhaust gas 390 to the coal mill 130. The temperature of the exhaust gas is raised, so that the effect of decreasing the flame propagation velocity is slightly inferior, though the pipe length can be shortened. Further, the method is suitable for a system using coal of an inferior ignition property.

Embodiment 3

Figure 5:
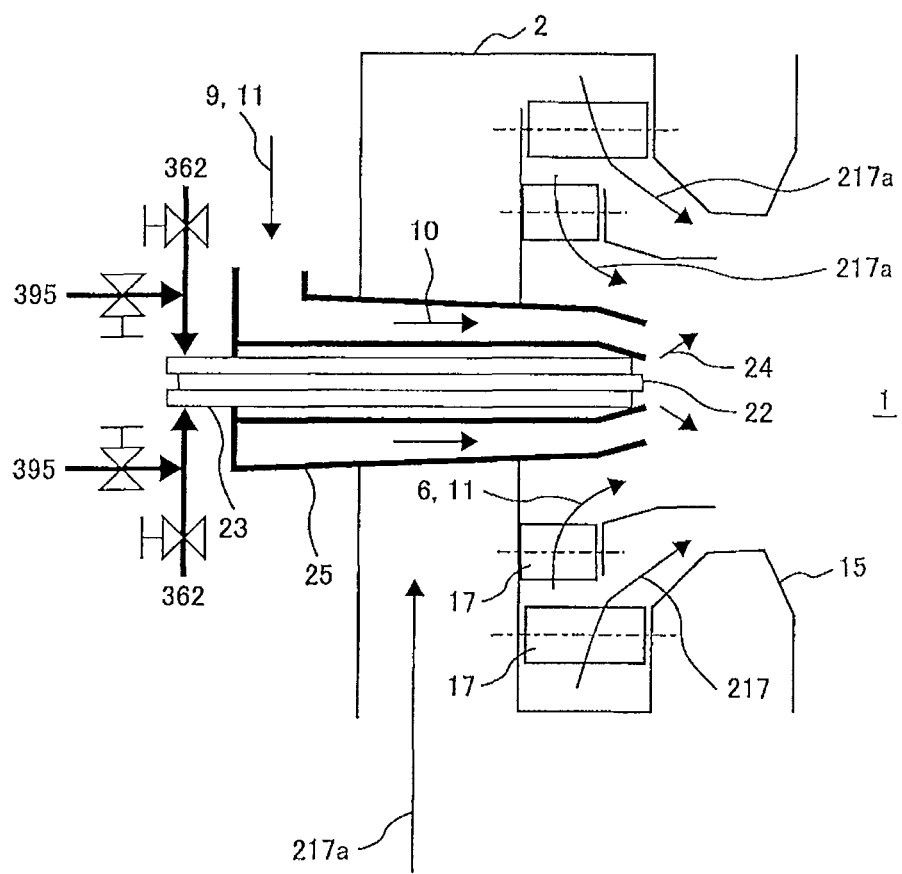
FIG. 5 is a drawing for illustrating the constitution of the pulverized coal burner applied to the oxyfuel combustion boiler plant of the embodiment.

FIG. 5 shows a burner configuration example when the system shown in FIGS. 1 to 4 is applied.

A starting oil burner 22 is installed at the central part of the burner. Further, an oxygen-enriched gas injection nozzle 23 is installed around the oil burner 22. Further, the oxygen-enriched gas injection nozzle 23 is installed at the leading edge of the first oxygen supply pipe 219. Around the oxygen-enriched gas injection nozzle 23, a primary nozzle 25 is installed and the primary nozzle 25 injects primary gas 10 that is a mixture of pulverized coal 9 and combustion exhaust gas 11 into a boiler furnace 1. Oxygen-enriched gas 24 is supplied from the inside of the primary gas 10 injected circularly. Secondary gas 217a is supplied from the circumference of the primary nozzle 25 into the boiler furnace 1. The secondary gas 217a is branched to two flow paths via a wind box 2, then is given the swirl component of the flow by a swirl vane 17, and is supplied into the boiler furnace 1. The primary gas 10 is supplied from the primary system pipe 216. Further, the secondary gas 217a is supplied from the secondary system pipe 217. The oxygen gas 362 is supplied to the oxygen-enriched gas injection nozzle 23. The oxygen gas 362, before being supplied to the oxygen-enriched gas injection nozzle 23, is mixed with a small quantity of the combustion exhaust gas 395.

Figure 6:
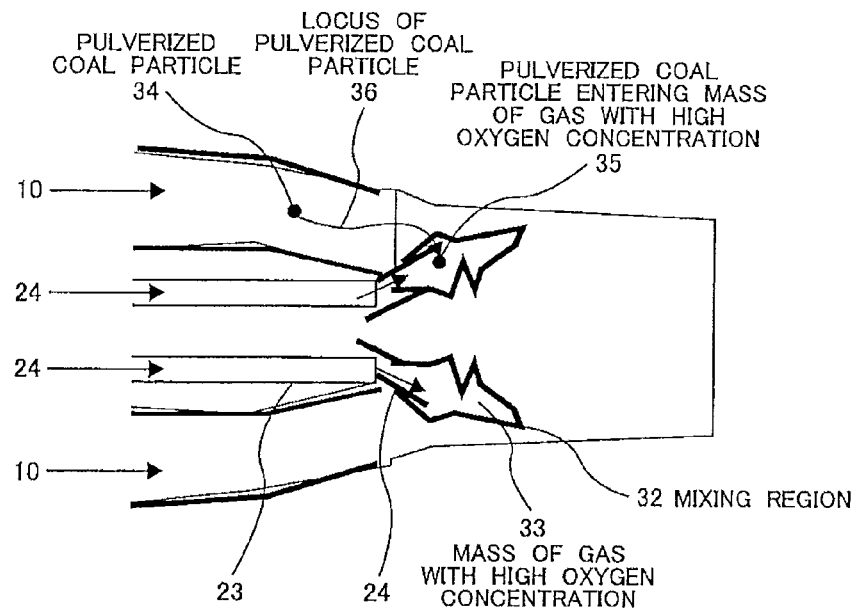
FIG. 6 is a drawing, in the constitution shown in FIG. 5, for illustrating the mixing state of the primary gas flow that is a mixture of pulverized coal and combustion exhaust gas and the oxygen-enriched gas injected into the boiler furnace.

FIG. 6 shows the gas mixing state in the vicinity of the injection port of the oxygen-enriched gas injection nozzle 23. The oxygen-enriched gas 24 is injected toward the flow of the primary gas 10. On the boundary between the oxygen-enriched gas 24 and the flow of the primary gas 10, a mixing region 32 is formed. However, the injected gas is not all mixed instantaneously, so that in the mixing region 32, a mass of gas with a high oxygen concentration 33 is temporarily formed. The flow of the primary gas 10 is accompanied with pulverized coal particles 34. The pulverized coal particles 34 will not move in complete correspondence with the flow of the primary gas 10. A part of the pulverized coal particles 34 is shifted from the flow of the primary gas 10 and moves independently. As a result, as shown in FIG. 6, the pulverized coal particles 34 may enter the mass of gas with a high oxygen concentration 33 via a locus 36 of pulverized coal particles. Pulverized coal particles 35 entering the mass of gas with a high oxygen concentration burn easily and the combustion temperature when they burn are raised. At this time, as the oxygen concentration of the mass of gas with a high oxygen concentration 35 is increased, the pulverized coal particles 35 burn easily and the combustion temperature is also raised. As shown in a characteristic drawing of the FIG. 2, the easiness of combustion corresponds to the relation between the oxygen concentration and the flame propagation velocity.

Here, when not supplying a small quantity of the combustion exhaust gas 395 to the oxygen gas 362, the pulverized coal particles 35 entering the mass of gas with high oxygen concentration burn under the atmospheric conditions close to pure oxygen. The flame propagation velocity is very high, so that abnormal combustion at a very high temperature occurs easily and molten damage may be caused to the burner portion. Further, as the forming region of the mass of gas with high oxygen concentration 35 is increased, such abnormal combustion occurs easily. Particularly, immediately after starting supply of the oxygen gas 362 or when changing the supply rate of oxygen gas, the forming region of the mass of gas with high oxygen concentration 35 easily increases instantaneously, so care should be taken.

When a small quantity of the combustion exhaust gas 395 is supplied to the oxygen gas 362 beforehand, no pure oxygen is supplied into the furnace, so that pulverized coal will not burn in the pure oxygen. As shown in the characteristic drawing of the FIG. 2, even if the oxygen concentration in the atmosphere is decreased slightly from 100%, the flame propagation velocity is greatly decreased. Therefore, a small quantity of the combustion exhaust gas 395 is mixed with the oxygen gas 362 beforehand, thus the effect of preventing abnormal combustion from occurring becomes high.

Further, the coal combustion property greatly varies with the properties of coal. To accelerate ignition in the vicinity of the burner and prevent abnormal combustion, the supply rate and supply method of the oxygen gas 362 must be adjusted according to the properties of the coal. When there is no system available for supplying a small quantity of the combustion exhaust gas 395 to the first oxygen supply pipe 219, the supply rate of the oxygen gas 362 and the injection speed at the time of supply must be adjusted and it is difficult to always maintain an optimum supply rate and the injection speed at the time of supply according to the properties of the coal.

On the other hand, when there is a system available for supplying a small quantity of the combustion exhaust gas 395 to the first oxygen supply pipe 219, so as to always keep the flame propagation velocity equal, the oxygen concentration of the oxygen-enriched gas 24 may be adjusted according to the properties of the coal. For example, in the coal used for the design standard, an optimum oxygen concentration is assumed as 80%. When using other coal, the relation between the atmosphere oxygen concentration and the flame propagation velocity of the coal actually used is obtained by experimentation and a characteristic curve as shown in FIG. 2 is prepared. At this time, when the oxygen concentration of the coal used is 90%, if the flame propagation velocity becomes equal to the flame propagation velocity of the standard coal, an optimum oxygen concentration of the coal used is 90%. The relation between the oxygen concentration of pulverized coal and the flame propagation velocity is obtained from experimentation of a small apparatus, so that before starting the operation of the plant, optimum operation conditions can be decided.

Further, after the operation state of the burner is shifted to oxyfuel combustion and reaches the stationary state, the forming region of the mass of gas with high oxygen concentration 35 is small, so abnormal combustion hardly occurs. According to the properties of the coal used, after the operation state of the burner reaches the stationary state, the supply of a small quantity of the combustion exhaust gas 395 may be stopped.

Embodiment 4

Figure 7:
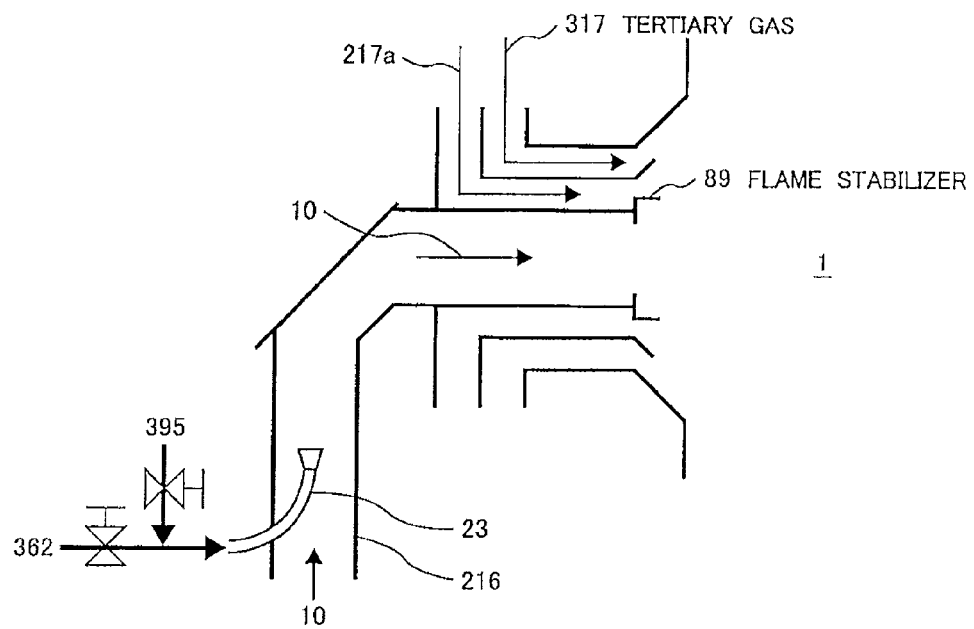
FIG. 7 is a drawing for illustrating a modification of the pulverized coal burner applied to the oxyfuel combustion boiler plant of the embodiment.

FIG. 7 shows a burner configuration example when the system shown in FIGS. 1 to 4 is applied and further shows a modification of the supply method of oxygen-enriched gas.

The primary gas 10 is injected from the central part of the burner into the boiler furnace 1. A flame stabilizer 89 accelerates ignition of pulverized coal. The secondary gas 217a is supplied from the circumference of the primary gas 10 and tertiary gas 317 is supplied furthermore from the circumference of the secondary gas 217a. Here, the tertiary gas 317, similarly to the secondary gas 217a, is a mixture of the circulation exhaust gas 390 and oxygen gas 362. It is possible to separate the secondary gas 217a and assume it as the tertiary gas 317 or the tertiary gas 317 may be supplied from another system. Further, it is possible to branch the tertiary gas 317 from the secondary gas 217a and then add the oxygen gas 362 into the tertiary gas 317. Or, it is possible to branch the secondary gas 217a from the tertiary gas 317 and then add the oxygen gas 362 into the secondary gas 217a.

Further, the oxygen-enriched gas injection nozzle 23 is installed at the leading edge of the first oxygen supply pipe 219. The primary gas 10 is supplied from the primary system pipe 216. Further, the secondary gas 217a is supplied from the secondary system pipe 217.

The oxygen-enriched gas injection nozzle 23 is installed in the primary system pipe 216 on the upstream side of the burner. The oxygen-enriched gas injection nozzle 23 supplies oxygen-enriched gas generated by mixing the oxygen gas 362 and a small quantity of the combustion exhaust gas 395 to the primary system pipe 216. This method has an advantage that when injecting into the boiler furnace or in the flow of the primary gas 10 immediately after the oxygen-enriched gas is injected, oxygen concentration irregularities are hardly produced. If the oxygen concentration irregularities are small, there is an advantage that the combustion properties such as the NOx discharge characteristic and lowest load property can be easily predicted. After the operation state of the burner reaches the stationary state of oxyfuel combustion, depending on the properties of the coal used, the supply of a small quantity of the combustion exhaust gas 395 may be stopped.

Embodiment 5

Figure 8:
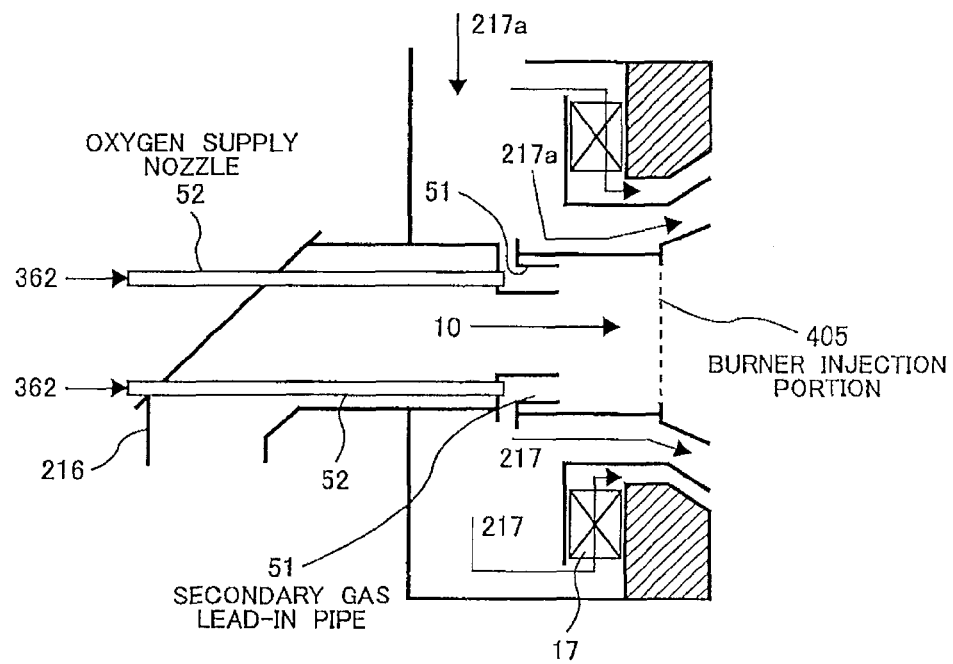
FIG. 8 is a drawing for illustrating another modification of the pulverized coal burner applied to the oxyfuel combustion boiler plant of the embodiment.

FIG. 8 shows a burner configuration example when the system shown in FIGS. 1 to 4 is applied and further shows another modification of the supply method of oxygen-enriched gas.

The burner structure of this embodiment is such that a part of the secondary gas 217a is led into the primary gas 10 using a secondary gas lead-in pipe 51. An oxygen supply nozzle 52 supplies the oxygen gas 362 into the secondary gas lead-in pipe 51. The oxygen gas 362 is mixed with a part of the secondary gas 217a in the secondary gas lead-in pipe 51 and then is supplied to the primary gas 10. Therefore, pure oxygen is not supplied directly into the primary gas and a mixture of the pure oxygen and pulverized gas is not formed. This method has an advantage that a pipe for supplying a small quantity of the combustion exhaust gas 395 can be omitted.

Further, the oxygen supply nozzle 52 is installed at the leading edge of the first oxygen supply pipe 219. The primary gas 10 is supplied from the primary system pipe 216. Further, the secondary gas 217a is supplied from the secondary system pipe 217.

In the burner structure shown in FIG. 8, the injection ports of the oxygen supply nozzle 52 and secondary gas lead-in pipe 51 are installed in the burner and are installed on the upstream side of a burner injection portion 405. Therefore, the ignition property in the vicinity of the burner can be greatly improved. Ideally, pulverized coal can be preferably ignited in the close vicinity of the burner injection portion 405. For that purpose, at the point of time when the primary gas 10 reaches the burner injection portion, it is desirable that the primary gas 10 and the oxygen gas 362 are mixed. However, the mixing of gas is accompanied with a fixed mixing delay, so that in consideration of the mixing delay, it is preferable that the oxygen supply nozzle 52 and the injection port of the secondary gas lead-in pipe 51 are installed on the upstream side of the burner injection portion 405.

Figure 10:
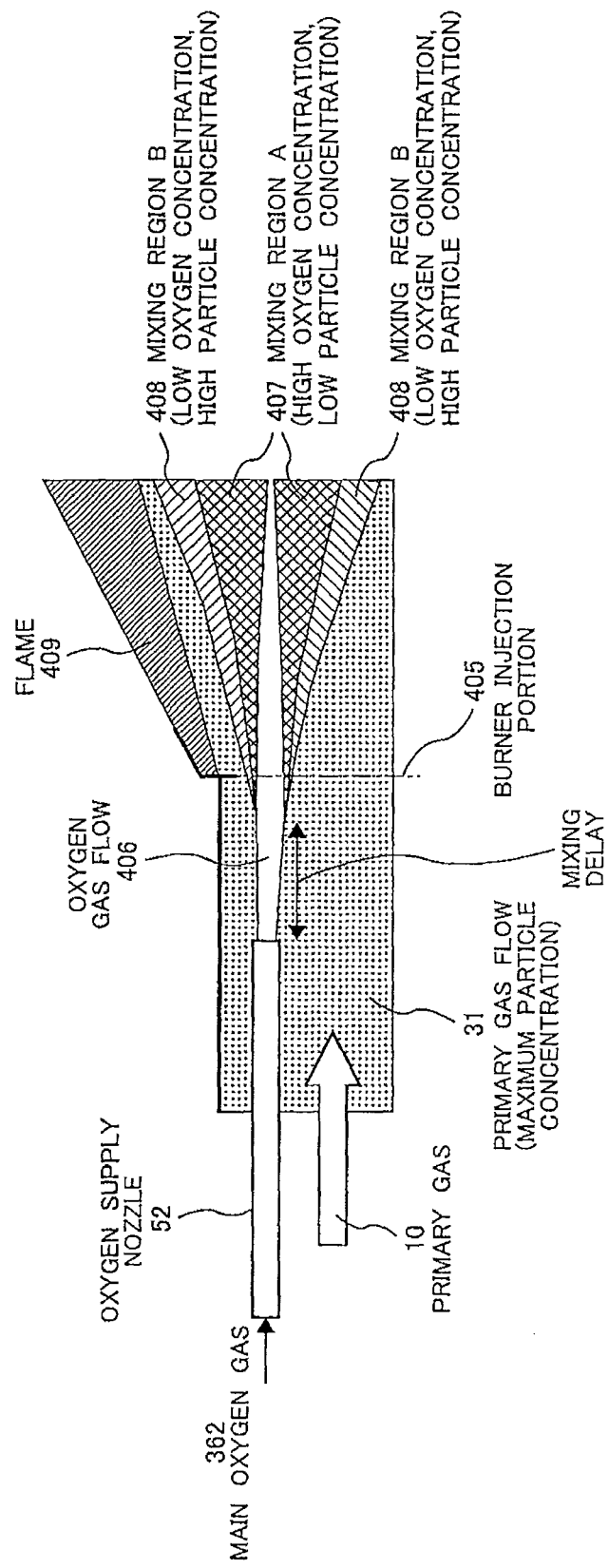
FIG. 10 is a drawing showing the mixing state in the vicinity of the burner injection port.

FIG. 10 is a drawing, in consideration of the mixing delay, schematically showing the distribution of the oxygen concentration and particle concentration in the vicinity of the burner. If the distance between the injection port of the oxygen supply nozzle 52 and the burner injection portion 405 is lengthened more than the mixing delay, in the vicinity of the burner injection portion 405, a mixing region is formed. The mixing region is a flow when a flow 406 of oxygen gas and a flow 31 of primary gas are mixed. In the mixing region, there exist masses of gas with various oxygen concentrations and particle concentrations. Here, for simplicity, two kinds of mixing regions, A 407 with a high oxygen concentration and a low particle concentration and a mixing region B 408 with a low oxygen concentration and a high particle concentration, are shown. In the region close to the flow 406 of oxygen gas, the mixing region A 407 is formed and in the region close to the flow 31 of primary gas, the mixing region B 408 is formed. The ignition property of pulverized coal depends on both particle concentration and oxygen concentration. Therefore, to judge which is ignited easily, the mixing region A 407 or the mixing region B 408, detailed experiments or calculations are necessary.

Around the primary gas flow, a flame 409 is formed. By the heat from the flame 409, pulverized coal is heated and ignited. However, the pulverized coal is heated also by radiation from the flame. Therefore, pulverized coal in the vicinity of the flame is not always ignited first.

Figure 11:
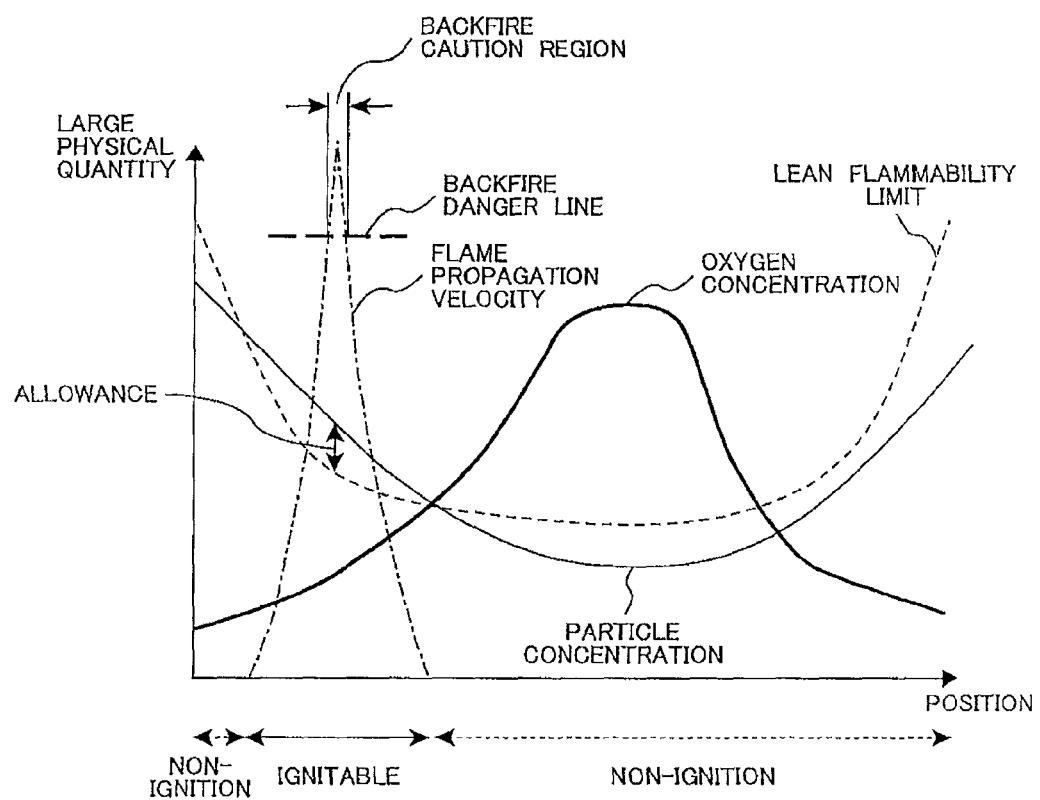
FIG. 11 is a conceptual diagram showing the distribution of the oxygen concentration in the vicinity of the burner injection port, particle concentration, lean flammability limit, and flame propagation velocity.

FIG. 11 is a drawing schematically showing the distribution of the oxygen concentration and particle concentration in the vicinity of the burner injection port 405. The flame propagation velocity and lean flammability limit are physical quantities indicating the ease of ignition. To ignite pulverized coal, a certain value or higher of particle concentration is necessary. This value is a lean flammability limit. The lean flammability limit is a flammable lower limit concentration in principle. However, in utility equipment, from the viewpoint of sure ignition, a value obtained by adding a safety factor to the flammable lower limit concentration may be used. As the oxygen concentration in gas increases, the lean flammability limit lowers. However, in the objective system, as the oxygen concentration increases, the particle concentration lowers. Therefore, the particle concentration in gas meeting a certain range of oxygen concentration exceeds the lean flammability limit. The necessary condition for realizing sure ignition in the vicinity of the burner is existence of a mass of gas having a particle concentration exceeding the lean flammability limit. Further, the lean flammability limit, if the ambient temperature rises, lowers. However, if the surrounding particles are ignited, the ambient temperature rises, so that as a result, the lean flammability limit lowers and the ignition condition is satisfied. If even a mass of gas meeting the ignition condition partially exists, there are possibilities that the entire mixture may ignite. And, if there exist no mass of gas having a particle concentration exceeding the lean flammability limit, the mixture cannot ignite.

In a real machine, change of the combustion load is necessary and due to the change of the combustion load, the average concentration of particles is changed. Generally, if the load lowers, the particle concentration lowers. In consideration of the load change, it is desirable that there is a certain degree of difference between the particle concentration and the lean flammability limit. The difference is defined as an allowance.

Another physical quantity is the flame propagation velocity. The flame propagation velocity is a judgment index of the occurrence condition of abnormal combustion such as a backfire. As the flame propagation velocity increases, the ignition is facilitated and if flame propagation velocity is excessively high, abnormal combustion easily occurs. If the flame propagation velocity is about 1 m/s, the flame moves. When the flow velocity of the mixture is slow than the flame propagation velocity, the flame moves toward the upstream side of the flow, so a backfire occurs. However, the flow velocity of the mixture is not a mean value but an instantaneous minimum value. Therefore, it is difficult to correctly predict the flow velocity of the mixture. By referring to the actual results of a similar system, if the flow velocity of the mixture is within the result range of the flame propagation velocity at this time, a judgment that no backfire would occur and abnormal combustion is practical. When the flame propagation velocity is higher than the result range, it is judged that there is a danger of backfire or abnormal combustion.

The inventors developed a model for predicting the flame propagation velocity and lean flammability limit (flammable lower limit concentration) under various combustion conditions. Using the model, the viability of the system is studied. An example of the experimental results and verification results that are used for the development of the model will be indicated below.

Figure 12:
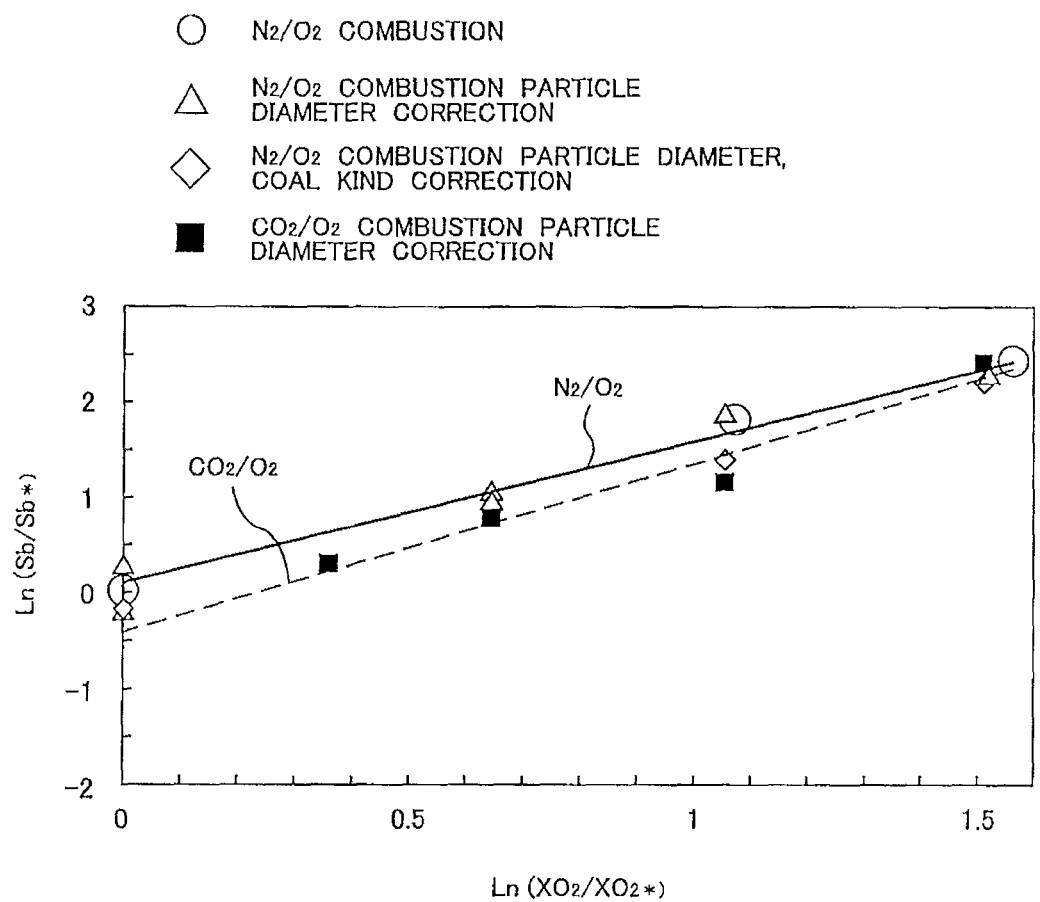
FIG. 12 is a drawing showing experimental results indicating a difference in the flame propagation velocity between the case that the oxidizing gas is of a $N_2/O_2$ system and the case that the oxidizing gas is of a $CO_2/O_2$ system (oxyfuel combustion)
Figure 13:
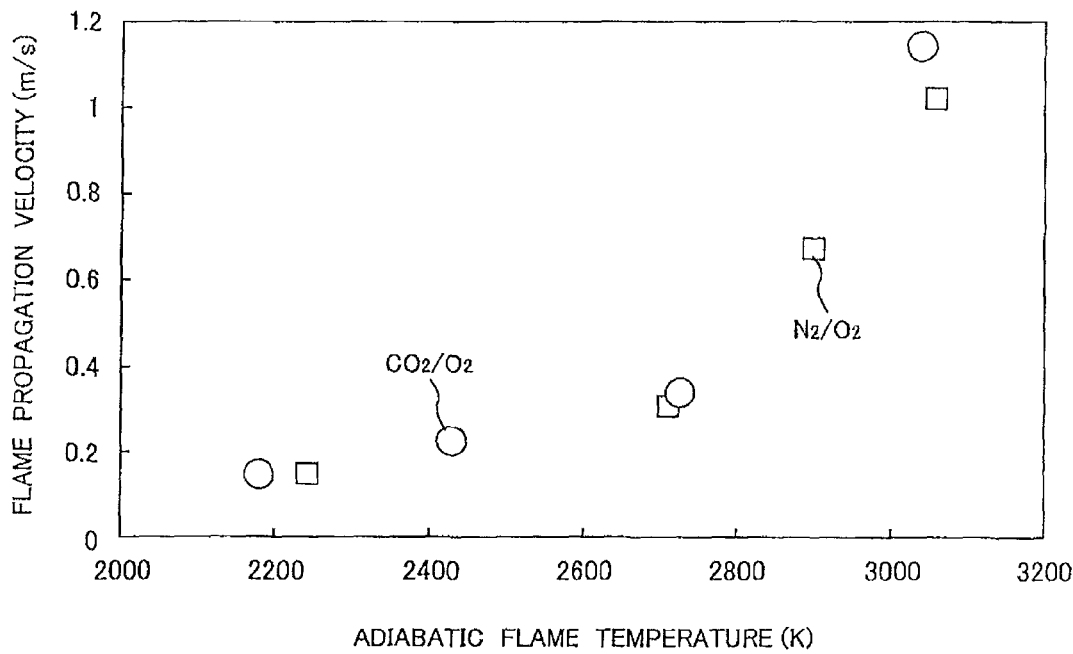
FIG. 13 is a drawing showing the relation between the adiabatic flame temperature and the flame propagation velocity.

FIGS. 12 and 13 show examples of the experimental results. FIG. 12 shows the comparison results of the flame propagation velocity between the case of combustion of $N_2/O_2$ (air-fuel combustion including 21% of $O_2$) and the case of combustion of $CO_2/O_2$ (oxyfuel combustion). Compared at the same oxygen concentration, the flame propagation velocity in the case of combustion of $CO_2/O_2$ is lower than that in the case of combustion of $N_2/O_2$. FIG. 13 shows a part of the results shown in FIG. 12 in association with the adiabatic flame temperature and the flame propagation velocity. Compared under the condition of the same adiabatic flame temperature, the flame propagation velocity in the case of combustion of $CO_2/O_2$ is equal to that in the case of combustion of $N_2/O_2$. The main cause of why the flame propagation velocity in the case of oxyfuel combustion is low is that a large volume of $CO_2$ with high specific heat is included in the oxidizing gas, thus the combustion temperature hardly rises.

Figure 14:
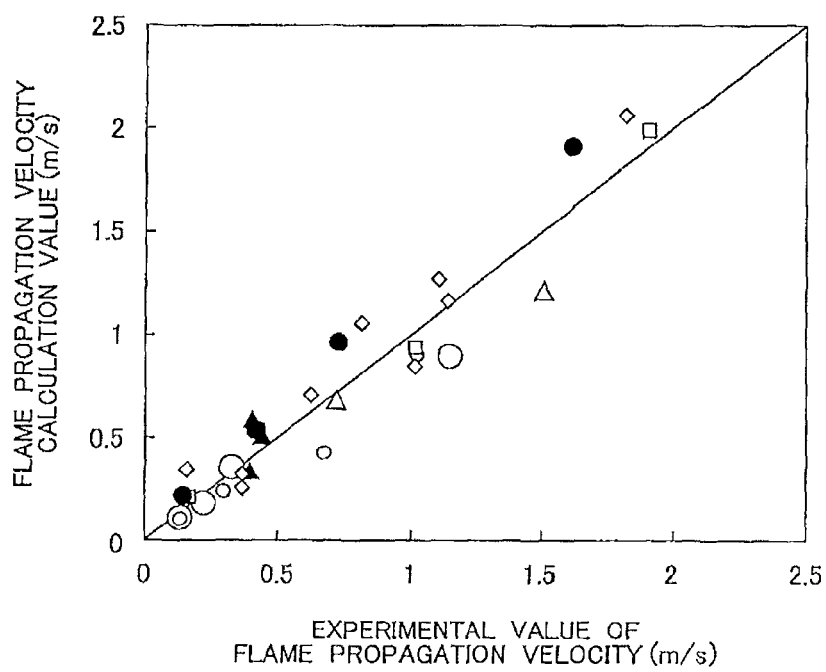
FIG. 14 is a drawing for comparing the experimental results of the flame propagation velocity with the calculation results.
Figure 15:
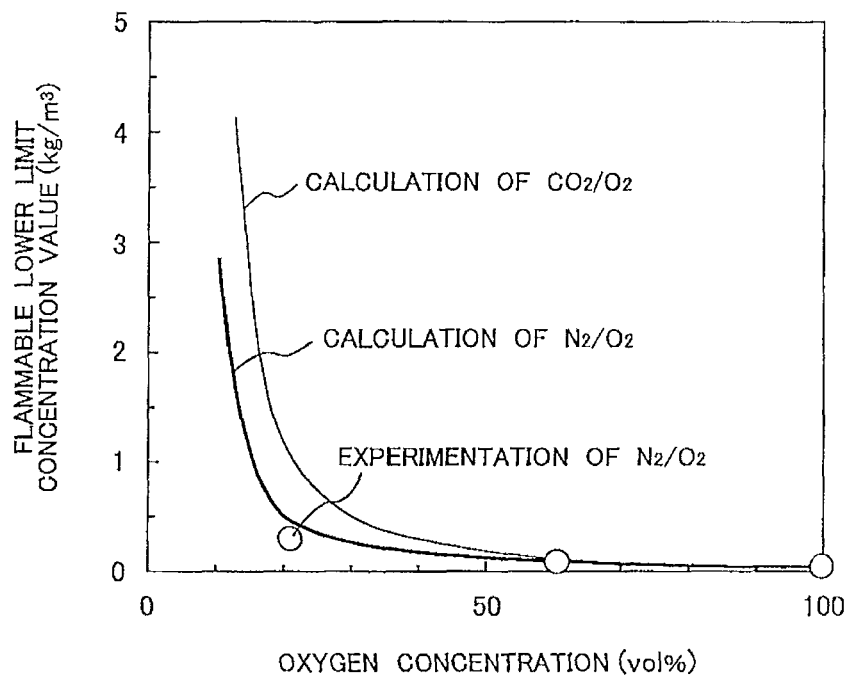
FIG. 15 is a drawing showing the calculation results indicating a difference in the flammable lower limit concentration between the case that the oxidizing gas is of a $N_2/O_2$ system and the case that the oxidizing gas is of a $CO_2/O_2$ system (oxyfuel combustion)
Figure 16:
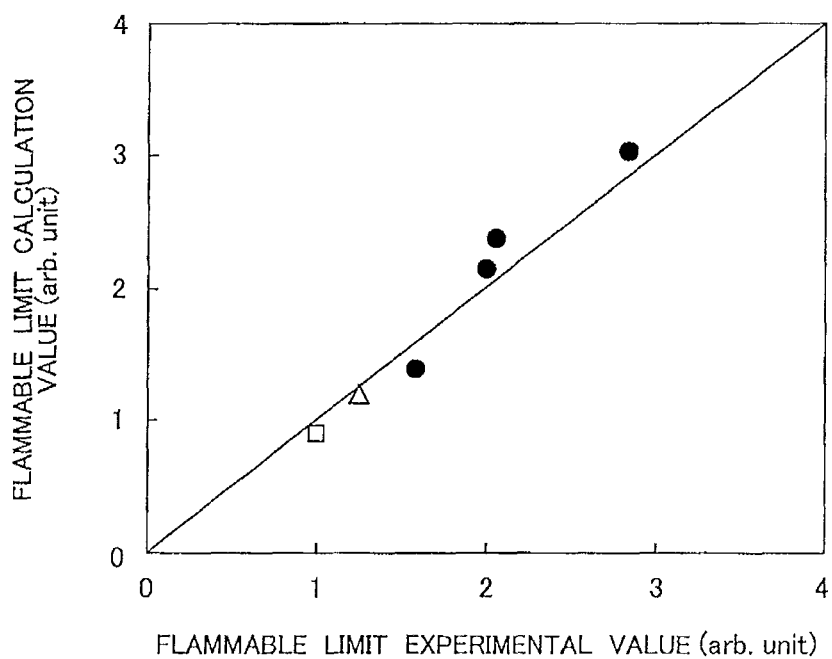
FIG. 16 is a drawing for comparing the experimental results of the flammable lower limit concentration (lean flammability limit) with the calculation results.

FIGS. 14 to 16 show examples of the verification results. FIG. 14 shows the verified results of the flame propagation velocity. The flame propagation velocity is verified by the basic experiments under the conditions that the oxidizing gas condition, oxygen concentration, ambient temperature, coal property, and particle diameter are changed variously. The white circles shown in the drawing indicate the results in the case of combustion of $CO_2/O_2$ and the others indicate the results in the case of combustion of $N_2/O_2$. Regardless of the oxidizing gas kind, the flame propagation velocity can be predicted to within an error of about 20%. FIG. 15 shows the verified results of the flammable lower limit concentration by the basic experiments. Bituminous coal is used for the experimentation. The reproduction of the influence of the oxygen concentration is confirmed. In the case of oxyfuel combustion, the flammable lower limit concentration when the oxygen concentration is 30±4 vol % coincides with that in the case of air-fuel combustion. FIG. 16 shows the verified results of the flammable lower limit concentration (lean flammability limit) using a large burner close to a real machine. It can be predicted to within an error of about 10%.

Figure 17:
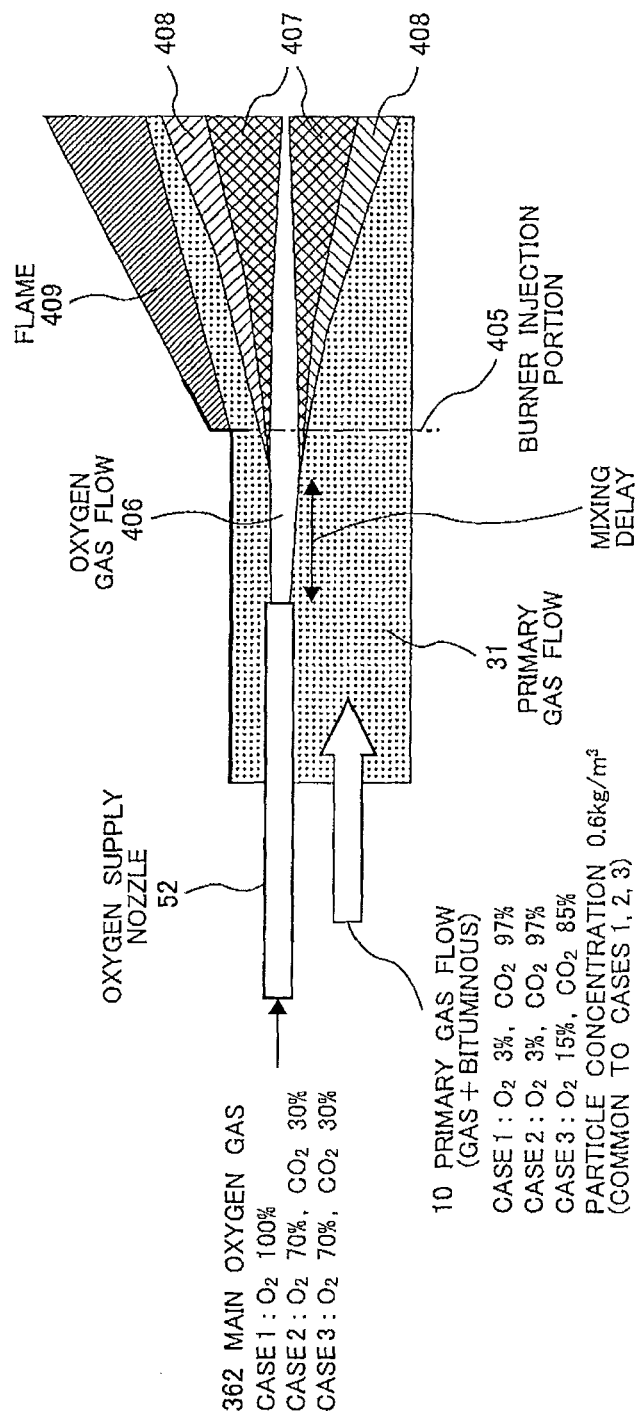
FIG. 17 is a drawing showing the calculation conditions for the calculation of inspection of the viability of the system.

Using this model, the case study of three cases is executed and the system viability is studied. FIG. 17 shows the study conditions. Case 1 is a case that pure oxygen is mixed in exhaust gas. Case 2 is an example of the present invention, in which the oxygen gas 362 is mixed with combustion exhaust gas and the oxygen concentration is reduced to 70%. Case 3 is a modification of the present invention. The difference from Case 2 is that the oxygen concentration in the primary gas 10 is high such as 15%. This is equivalent to the condition of mixing circulation exhaust gas flowing into the coal mill 130 with a part of oxygen gas and increasing beforehand the oxygen concentration of the circulation exhaust gas. The objective coal is bituminous coal. The particle diameter is the same in the three cases. The pulverized coal concentration in the primary gas 10 is the same in the three cases and is set at 0.6 kg/m$^3$.

Figure 18:
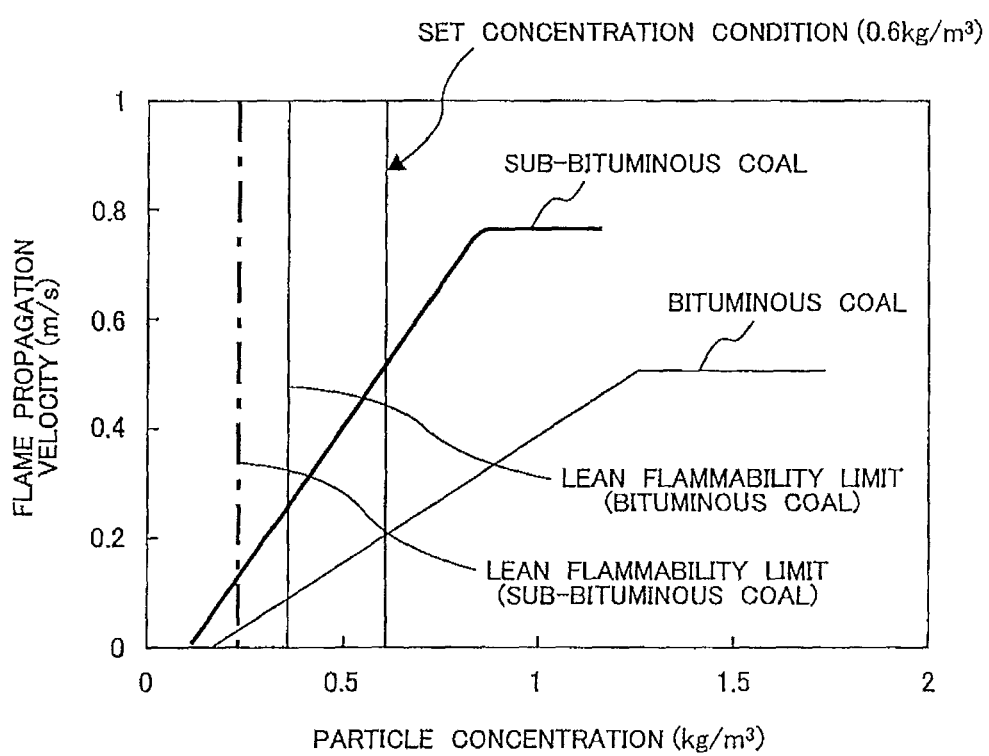
FIG. 18 is a drawing showing the calculation results indicating the relation between the particle concentration at the time of air-fuel combustion and the flame propagation velocity.

Prior to the study, for comparison, the flame propagation velocity and lean flammability limit at the time of air-fuel combustion are calculated. The results are shown in FIG. 18. At the time of air-fuel combustion, the primary gas 10 is air and in the vicinity of the burner, no oxygen-enriched gas is supplied. Bituminous coal and sub-bituminous coal that are frequently used in a pulverized coal boiler are calculated.

Under the condition of a particle concentration of 0.6 kg/m$^3$ that is set in the case study, the flame propagation velocity is 0.2 m/s in the case of bituminous coal and 0.5 m/s in the case of sub-bituminous coal. However, in a real machine, there exists locally a region with a high particle concentration, so the flame propagation velocity may be higher than the aforementioned values. The maximum value of the flame propagation velocity is 0.5 m/s in the case of bituminous coal and 0.8 m/s in the case of sub-bituminous coal. In this study, the result range is defined as 0.2 to 0.8 m/s. When the flame propagation velocity exceeds 0.8 m/s, it is assumed as beyond the actual result and it is decided that care should be taken for a backfire. The lean flammability limit is defined as a value two times that of the flammable lower limit concentration. If there exists a mass of gas having a particle concentration higher than the lean flammability limit, it is judged that pulverized coal can ignite. A value obtained by dividing the particle concentration by the lean flammability limit is defined as an allowance. In the case of air-fuel combustion, the allowance at the time of combustion of sub-bituminous coal is 2.6 and the allowance at the time of combustion of bituminous coal is 1.7. A system configuration that meets the necessary conditions relating to ignition and backfire and furthermore can ensure the allowance equivalent to that in the case of air-fuel combustion is judged as most desirable.

Figure 19:
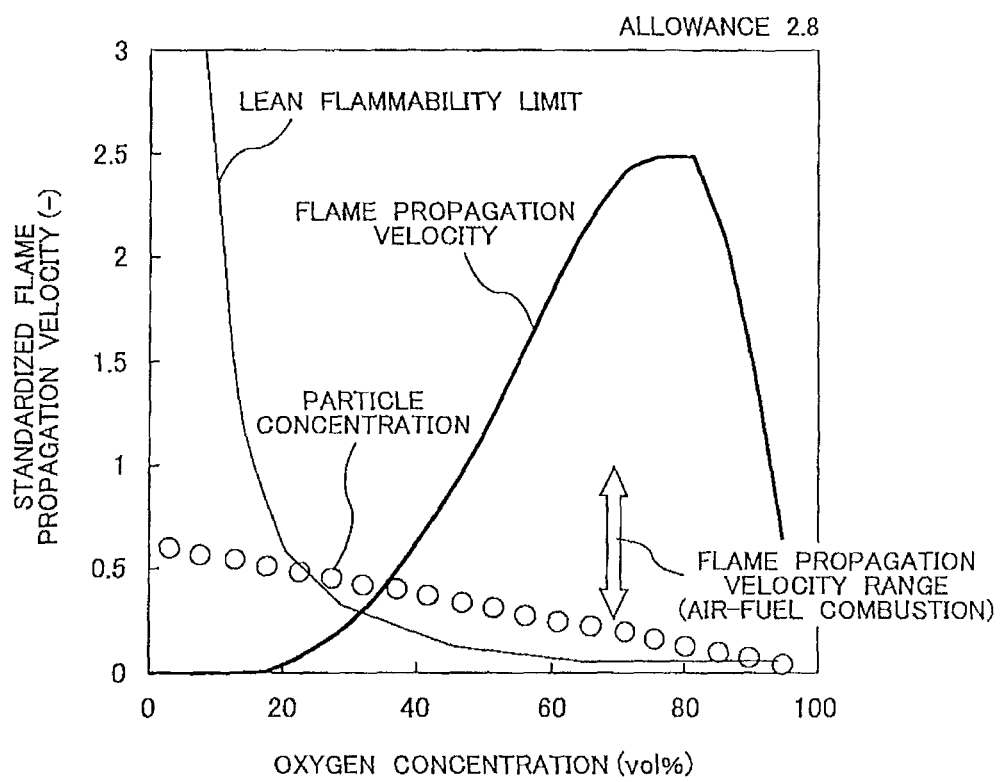
FIG. 19 is a drawing showing the study results of the viability of the system (Case 1)

FIG. 19 shows the study results of Case 1. The horizontal axis indicates the oxygen concentration of a mass of gas and the particle concentration, and the lean flammability limit and flame propagation velocity corresponding to it are indicated in the vertical axis. The flame propagation velocity is standardized and indicated by setting its maximum value when sub-bituminous coal is used for air-fuel combustion to 1. Within a wide range of oxygen concentrations from 30 to 80%, the ignition condition is satisfied and there is little fear of non-ignition. However, regarding the flame, propagation velocity, there exist a mass of gas having a flame propagation velocity about three times that of the actual result. It is necessary to be careful of backfires and it is preferable to make the flame propagation velocity lower. The reason that the flame propagation velocity increases is that even under the condition that the oxygen concentration is very high such as close to 80%, a flammable mixture may be formed.

Figure 20:
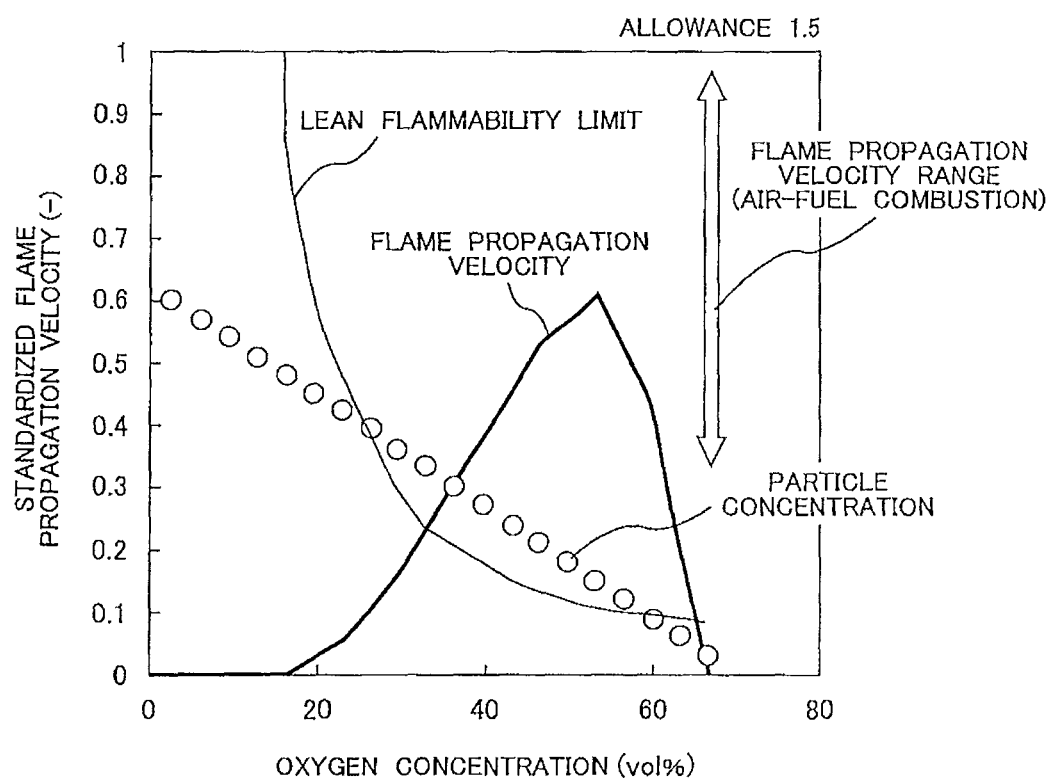
FIG. 20 is a drawing showing an example of the study results of the viability of the system (Case 2)

FIG. 20 shows the study results of Case 2. The oxygen concentration in the oxygen gas 362 is reduced to 70%, thus a flammable mixture having an extremely high oxygen concentration is not formed. As a result, the flame propagation velocity is controlled within the result range. There exists a mass of gas meeting the ignition condition, thus the necessary condition of system realization is satisfied. However, the allowance becomes smaller than the result of the air-fuel combustion. Therefore, the oxygen concentration in the oxygen gas 362 is further changed. When the oxygen concentration is increased, the allowance can be ensured, though the flame propagation velocity increases excessively. On the other hand, when the oxygen concentration is decreased, the ignition condition is hardly satisfied.

Figure 21:
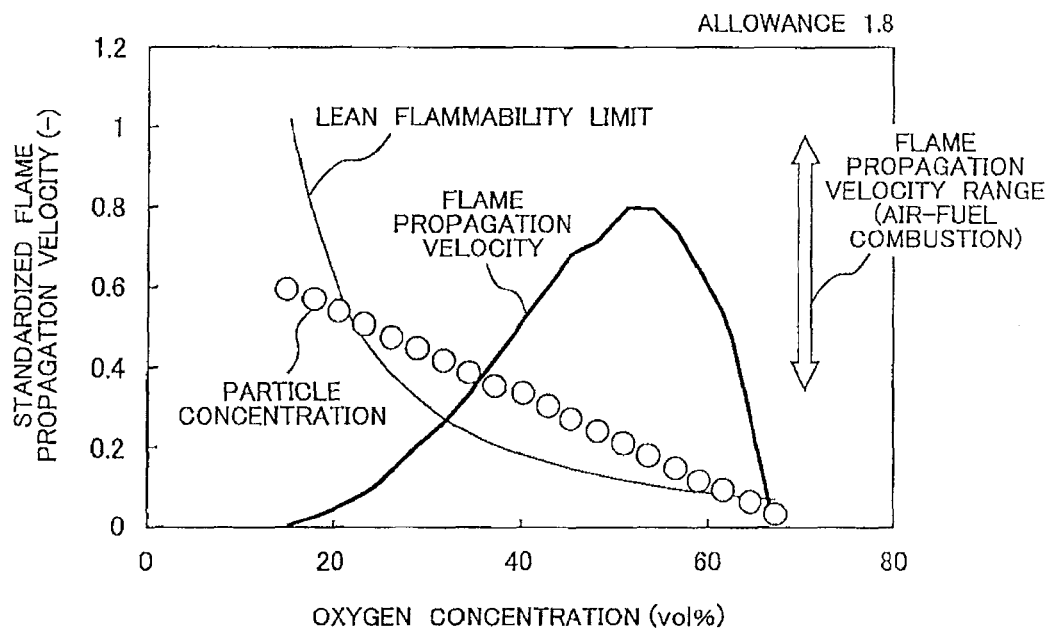
FIG. 21 is a drawing showing an example of the study results of the viability of the system (Case 3)

FIG. 21 shows the study results of Case 3. The allowance similar to that of the air-fuel combustion is ensured and the flame propagation velocity can be controlled within the result range. In Case 2 where the oxygen gas 362 is mixed in the primary gas 10, the particle concentration is lower than the ignition lower limit, so pulverized coal in the coaling system will not meet the ignition condition. The inventors studied the condition by changing the combination of the oxygen concentration in the oxygen gas 362 and the oxygen concentration in the primary gas 10 and found that there exist many combinations meeting the system realization condition.

Embodiment 6

Figure 9:
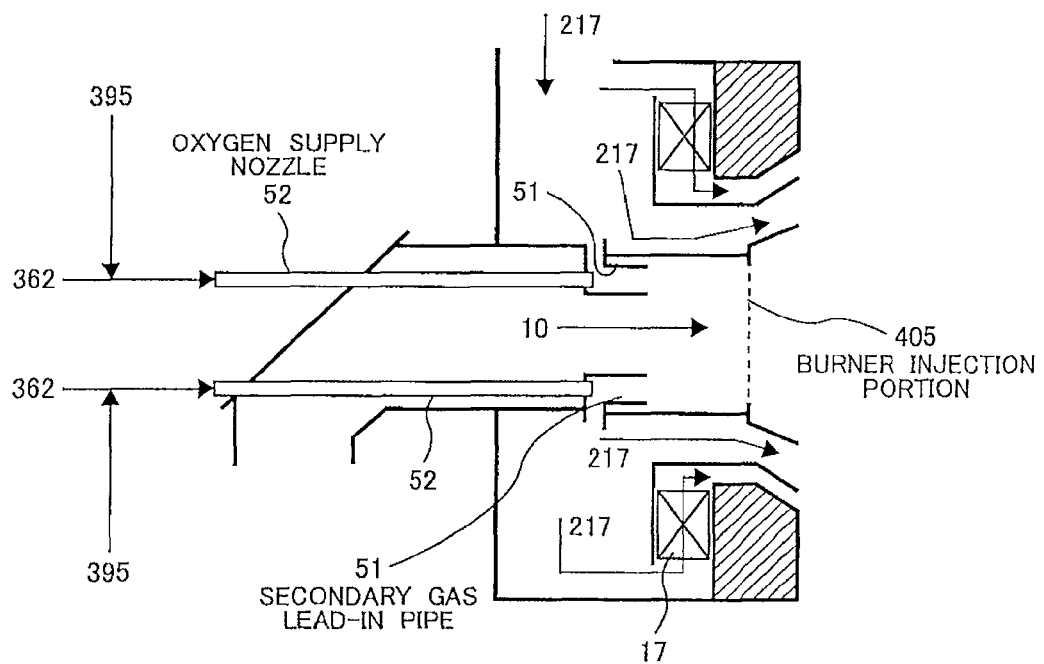
FIG. 9 is a drawing for illustrating still another modification of the pulverized coal burner applied to the oxyfuel combustion boiler plant of the embodiment.

FIG. 9 shows a burner configuration example when the system shown in FIGS. 1 to 4 is applied and further shows still another modification of the supply method of oxygen-enriched gas.

The difference between FIG. 8 and FIG. 9 is the respect that the combustion exhaust gas 395 is supplied to the oxygen gas 362. Also in the burner structure shown in FIG. 9, the injection ports of the oxygen supply nozzle 52 and secondary gas lead-in pipe 51 are installed on the upstream side of the burner injection portion 405. Therefore, the ignition property in the vicinity of the burner can be improved even more.

Embodiment 7

Figure 22:
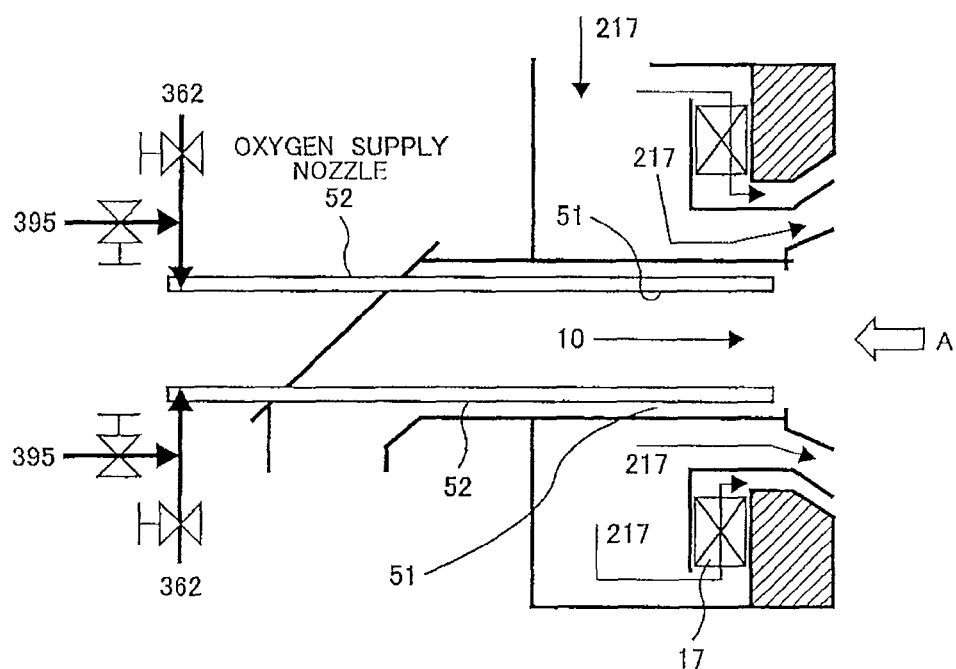
FIG. 22 is a drawing for illustrating a modification of the pulverized coal burner applied to the oxyfuel combustion boiler plant of the embodiment.

FIG. 22 shows a burner configuration example when the system shown in FIGS. 1 to 4 is applied. FIG. 22 shows a structure that oxygen gas and combustion exhaust gas are mixed beforehand to reduce the oxygen concentration and then are supplied from the oxygen supply nozzle 52 into the primary gas 10 and the secondary gas lead-in pipe 51 is omitted. By use of this constitution, the oxygen concentration in the oxygen gas 362 injected from the oxygen supply nozzle 52 can be precisely controlled. The constitution is valid when using coal that is difficult to ignite.

Figure 23:
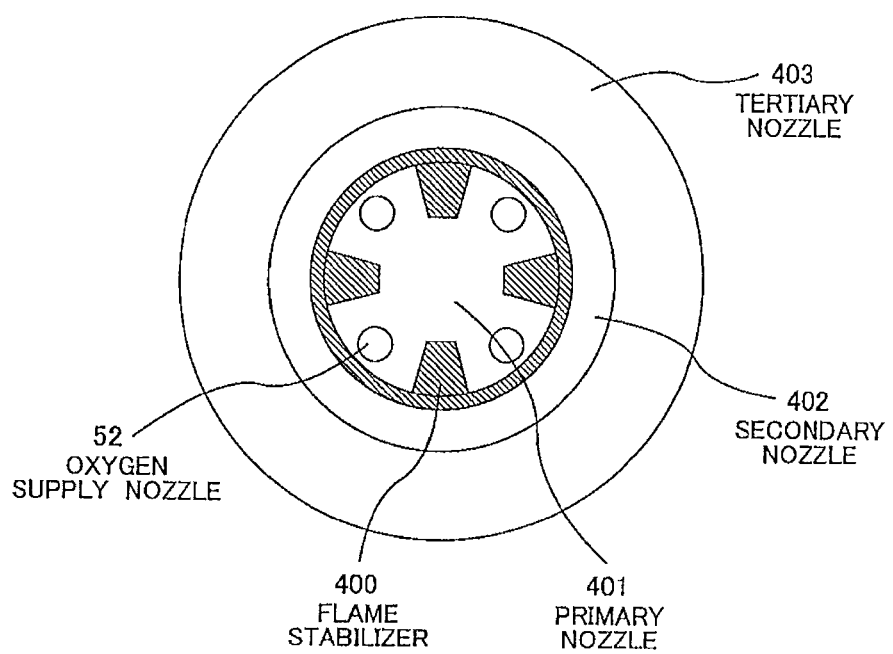
FIG. 23 is a drawing for illustrating another modification of the pulverized coal burner applied to the oxyfuel combustion boiler plant of the embodiment and it is a drawing of the burner shown in FIG. 22 that is viewed in the direction of the furnace.

FIG. 23 is a drawing when the burner is viewed in the direction A. On the outer periphery side of a primary nozzle 401, flame stabilizers 400 are installed in a comb teeth shape. Around the primary nozzle 401, a secondary nozzle 402 and a tertiary nozzle 403 are arranged concentrically. The oxygen supply nozzles 52 are arranged between the flame stabilizers 400.

Figure 24:
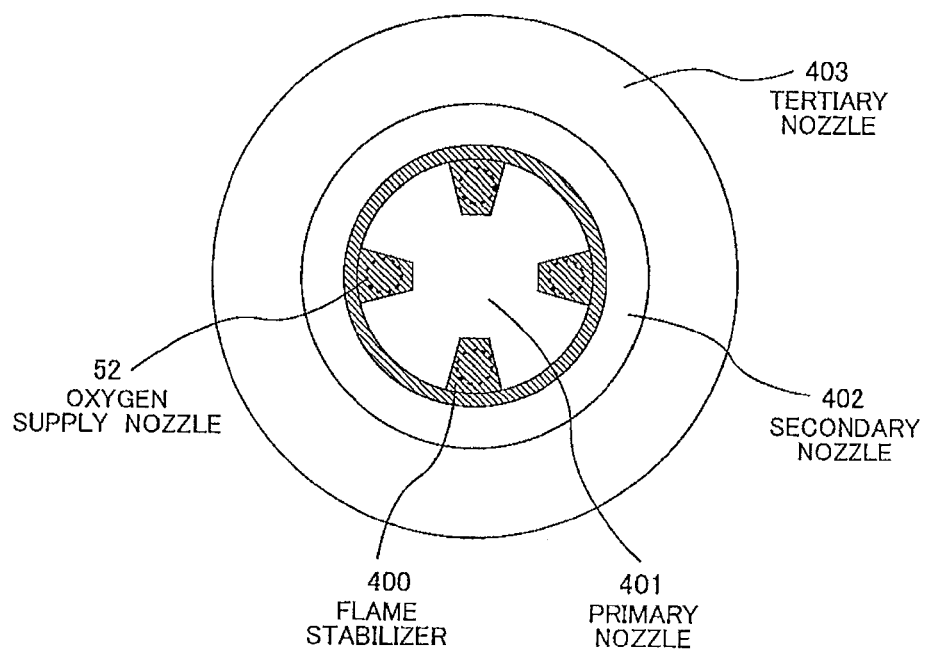
FIG. 24 is a drawing for illustrating still another modification of the pulverized coal burner applied to the oxyfuel combustion boiler plant of the embodiment and it is a modification of the drawing of the burner shown in FIG. 22 that is viewed in the direction of the furnace.

FIG. 24 shows a modification of the arrangement method of the oxygen supply nozzles 52. The oxygen supply nozzles 52 are arranged on the right upstream side of the flame stabilizers 400. In the constitutions of FIGS. 23 and 24, the oxygen concentration distribution closest to the flame stabilizers is different. In the constitution shown in FIG. 24, the oxygen concentration closest to the flame stabilizers 400 is high. The oxygen concentration on the right upstream side of the flame stabilizers 400 is also high. In the closest portion of the flame stabilizers 400, the flow disturbance is strong, so that it is the most advantageous region for flame formation. If the oxygen concentration in this portion is increased, it is the most advantageous for ignition. On the other hand, the oxygen concentration on the right upstream side of the flame stabilizers 400 is also increased, so that when easily ignitable coal is used, there is a fear that pulverized coal may be ignited here and the flame stabilizers 400 may be burnt out. Therefore, the constitution shown in FIG. 24 is a constitution suitable for use with coal that is difficult to ignite.

On the other hand, in the constitution shown in FIG. 23, the region with a high oxygen concentration is formed in the region slightly away from the closest portion of the flame stabilizers. Therefore, there is little fear of burnout of the flame stabilizers 400. This constitution is a constitution suitable for use with easily ignitable coal.

What is claimed is:

1. An oxyfuel combustion boiler plant comprising:
   an air separation unit for manufacturing oxygen by separating nitrogen from air,
   a boiler having a burner for burning the oxygen supplied from the air separation unit and pulverized coal,
   a primary system pipe for supplying the pulverized coal to the burner,
   a first exhaust gas recirculation system for supplying combustion exhaust gas discharged from the boiler to the primary system pipe by recirculating the combustion exhaust gas through the first exhaust gas recirculation system, and
   a carbon dioxide capture unit for capturing carbon dioxide in the exhaust gas discharged from the boiler,
   wherein the oxyfuel combustion boiler plant is further comprising:
   a second circulation exhaust gas system for supplying the combustion exhaust gas discharged from the boiler to the oxygen supply pipe by recirculating the combustion exhaust gas through the second exhaust gas recirculation system,
   a connection portion of the oxygen supply pipe connected to the second circulation exhaust gas system is installed on the upstream side of another connection portion of the oxygen supply pipe connected to the primary system pipe, and
   an injection port of the oxygen supply pipe is disposed on an upstream side of an injection portion of the burner.

2. The oxyfuel combustion boiler plant according to claim 1,
   the oxyfuel combustion boiler plant is further comprising:
   a coal mill supplied with the combustion exhaust gas discharged from the boiler for supplying a mixture flow of the pulverized coal and the combustion exhaust gas to the primary system pipe, and
   a pipe branched from the oxygen supply pipe which is connecting to the coal mill on an upstream side thereof.

3. The oxyfuel combustion boiler plant according to claim 1, wherein:
   the burner includes a flow path for permitting primary gas in the primary system pipe to flow through, a flow path for permitting secondary gas to flow through on an outer periphery side of the flow path for permitting the primary gas to flow through, a secondary gas lead-in pipe for supplying a part of the secondary gas to the primary gas, and
   an oxygen supply nozzle for leading the oxygen manufactured by the air separation unit into the secondary gas lead-in pipe is provided.

4. The oxyfuel combustion boiler plant according to claim 3, wherein:
   an injection port of the secondary gas lead-in pipe is disposed on the upstream side of the injection port of the burner.

5. The oxyfuel combustion boiler plant according to claim 3, wherein:
   a dryer for cooling the exhaust gas discharged from the boiler and simultaneously removing hygroscopic moisture is installed on a downstream side of an exhaust pipe, so that the exhaust gas discharged from the dryer is supplied to the second circulation exhaust gas system.

* * * * *